United States Patent
Rajagopalan et al.

(10) Patent No.: US 10,938,957 B1
(45) Date of Patent: Mar. 2, 2021

(54) SYSTEM AND METHOD FOR BRIDGING GAPS BETWEEN TRADITIONAL RESOURCE MANAGEMENT SOLUTIONS WITH CLOUD-BASED MANAGEMENT SOLUTIONS

(71) Applicant: DELL PRODUCTS, LP, Round Rock, TX (US)

(72) Inventors: Vivekanandh Narayanasamy Rajagopalan, Bangalore (IN); Srikanth Kondapi, Austin, TX (US)

(73) Assignee: Dell Products, L.P., Round Rock, TX (US)

( * ) Notice: Subject to any disclaimer, the term of this patent is extended or adjusted under 35 U.S.C. 154(b) by 0 days.

(21) Appl. No.: 16/569,013

(22) Filed: Sep. 12, 2019

(51) Int. Cl.
*H04L 12/24* (2006.01)
*H04L 29/08* (2006.01)
*G06F 8/61* (2018.01)
*G06F 8/65* (2018.01)

(52) U.S. Cl.
CPC .............. *H04L 67/34* (2013.01); *G06F 8/61* (2013.01); *G06F 8/65* (2013.01); *H04L 67/1014* (2013.01)

(58) Field of Classification Search
CPC ...... G06F 16/2329; G06F 9/5033; G06F 8/61; G06F 8/65; H04L 67/101; H04L 67/1097; H04L 67/34
See application file for complete search history.

(56) References Cited

U.S. PATENT DOCUMENTS

| | | | |
|---|---|---|---|
| 2007/0169079 A1* | 7/2007 | Keller | G06F 8/65 717/168 |
| 2014/0164650 A1 | 6/2014 | Thornley et al. | |
| 2020/0036582 A1* | 1/2020 | Pannem | H04L 41/0859 |

FOREIGN PATENT DOCUMENTS

EP          3217301 A1 *  9/2017  .......... G06F 11/1451

* cited by examiner

*Primary Examiner* — Chirag R Patel
(74) *Attorney, Agent, or Firm* — Larson Newman, LLP

(57) ABSTRACT

An enterprise computing management system includes an on-premise computing management system for deploying an update to a first resource and for triggering synchronization of the update to a second resource after deploying the update. The first resource is managed by the on-premise computing management system. A cloud-based computing management system deploys the update to the second resource that is managed by the cloud-based computing management system. In response to the triggering of the synchronization of the update to the second resource, a processor retrieves metadata information of the update, generates a catalog based on the metadata information of the update, publishes the catalog to a repository, and deploys the update to the second resource.

20 Claims, 5 Drawing Sheets

SYSTEM AND METHOD FOR BRIDGING GAPS BETWEEN TRADITIONAL RESOURCE MANAGEMENT SOLUTIONS WITH CLOUD-BASED MANAGEMENT SOLUTIONS

FIELD OF THE DISCLOSURE

The present disclosure generally relates to information handling systems, and more particularly relates to bridging gaps between traditional resource management solutions with cloud-based management solutions.

BACKGROUND

As the value and use of information continue to increase, individuals and businesses seek additional ways to process and store information. One option is an information handling system. An information handling system generally processes, compiles, stores, and/or communicates information or data for business, personal, or other purposes. Because technology and information handling needs and requirements may vary between different applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, reservations, enterprise data storage, or global communications. In addition, information handling systems may include a variety of hardware and software resources that may be configured to process, store, and communicate information and may include one or more computer systems, data storage systems, and networking systems.

SUMMARY

An enterprise computing management system includes an on-premise computing management system for deploying an update to a first resource and for triggering synchronization of the update to a second resource after deploying the update. The first resource is managed by the on-premise computing management system. A cloud-based computing management system may deploy the update to the second resource that is managed by the cloud-based computing management system. In response to the triggering of the synchronization of the update to the second resource, a processor may retrieve metadata information of the update, generate a catalog based on the metadata information of the update, publish the catalog to a repository, and deploy the update to the second resource

BRIEF DESCRIPTION OF THE DRAWINGS

It will be appreciated that for simplicity and clarity of illustration, elements illustrated in the Figures are not necessarily drawn to scale. For example, the dimensions of some elements may be exaggerated relative to other elements. Embodiments incorporating teachings of the present disclosure are shown and described with respect to the drawings herein, in which.

The use of the same reference symbols in different drawings indicates similar or identical items.

DETAILED DESCRIPTION OF THE DRAWINGS

The following description in combination with the Figures is provided to assist in understanding the teachings disclosed herein. The description is focused on specific implementations and embodiments of the teachings and is provided to assist in describing the teachings. This focus should not be interpreted as a limitation on the scope or applicability of the teachings.

Figure 1:
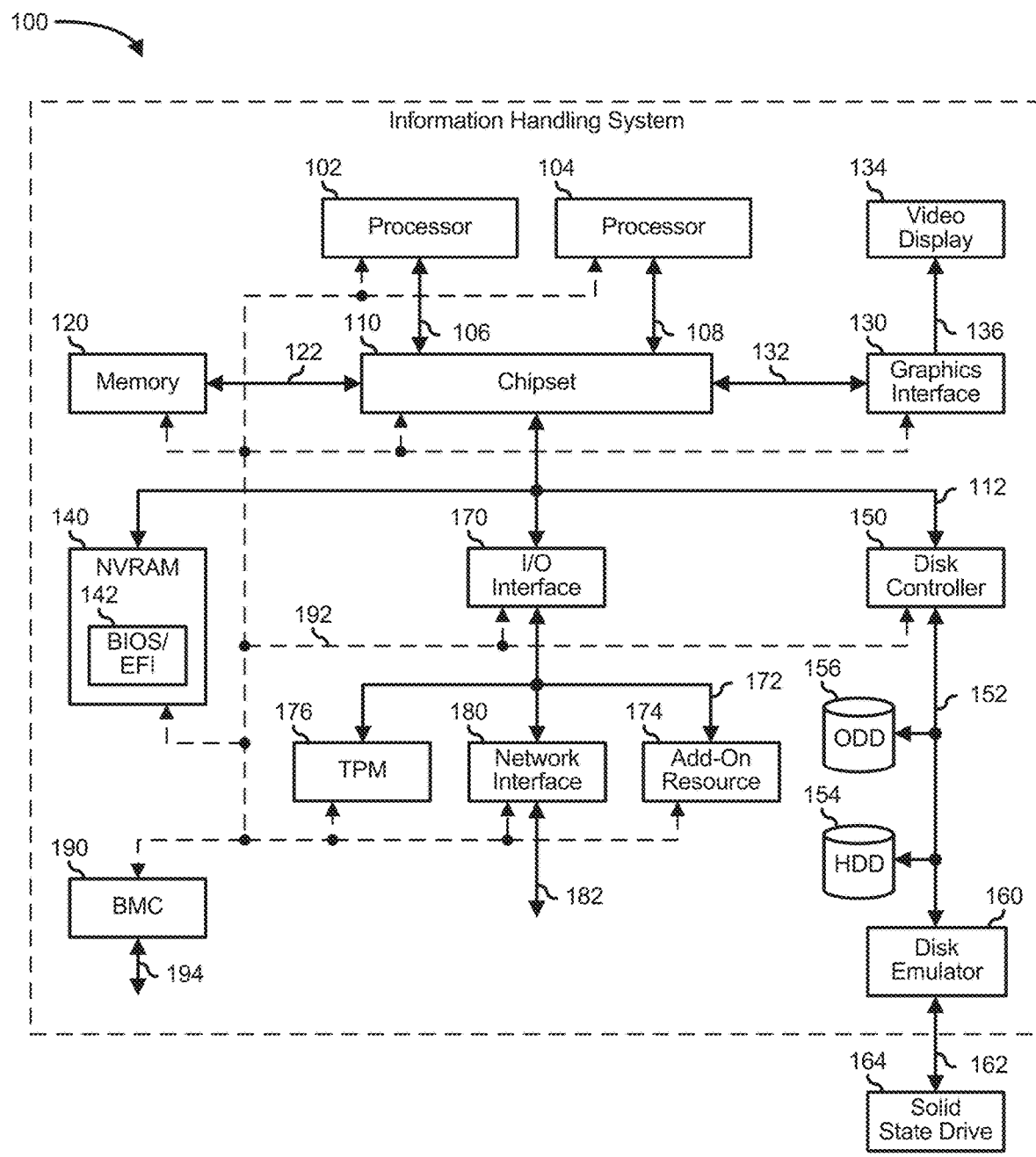
FIG. 1 is a block diagram of a general information handling system, according to an embodiment of the present disclosure.

FIG. 1 illustrates an embodiment of an information handling system 100 including processors 102 and 104, a chipset 110, a memory 120, a graphics adapter 130 connected to a video display 134, a non-volatile RAM (NV-RAM) 140 that includes a basic input and output system/extensible firmware interface (BIOS/EFI) module 142, a disk controller 150, a hard disk drive (HDD) 154, an optical disk drive 156, a disk emulator 160 connected to a solid-state drive (SSD) 164, an input/output (I/O) interface 170 connected to an add-on resource 174 and a trusted platform module (TPM) 176, a network interface 180, and a baseboard management controller (BMC) 190. Processor 102 is connected to chipset 110 via processor interface 106, and processor 104 is connected to the chipset via processor interface 108. In a particular embodiment, processors 102 and 104 are connected together via a high-capacity coherent fabric, such as a HyperTransport link, a QuickPath Interconnect, or the like. Chipset 110 represents an integrated circuit or group of integrated circuits that manage the data flow between processors 102 and 104 and the other elements of information handling system 100. In a particular embodiment, chipset 110 represents a pair of integrated circuits, such as a northbridge component and a southbridge component. In another embodiment, some or all of the functions and features of chipset 110 are integrated with one or more of processors 102 and 104.

Memory 120 is connected to chipset 110 via a memory interface 122. An example of memory interface 122 includes a Double Data Rate (DDR) memory channel and memory 120 represents one or more DDR Dual In-Line Memory Modules (DIMMs). In a particular embodiment, memory interface 122 represents two or more DDR channels. In another embodiment, one or more of processors 102 and 104 include a memory interface that provides a dedicated memory for the processors. A DDR channel and the connected DDR DIMMs can be in accordance with a particular DDR standard, such as a DDR3 standard, a DDR4 standard, a DDR5 standard, or the like. Memory 120 may further represent various combinations of memory types, such as Dynamic Random Access Memory (DRAM) DIMMs, Static Random Access Memory (SRAM) DIMMs, non-volatile DIMMs (NV-DIMMs), storage class memory devices, Read-Only Memory (ROM) devices, or the like. Graphics adapter 130 is connected to chipset 110 via a graphics interface 132 and provides a video display output 136 to a video display 134. An example of a graphics interface 132 includes a Peripheral Component Interconnect-Express (PCIe) interface and graphics adapter 130 can include a four lane (x4) PCIe adapter, an eight lane (x8) PCIe adapter, a 16-lane (x16) PCIe adapter, or another configuration, as needed or desired. In a particular embodiment, graphics adapter 130 is provided down on a system printed circuit board (PCB). Video display output 136 can include a Digital Video Interface (DVI), a High-Definition Multimedia Interface (HDMI), a DisplayPort interface, or the like, and video display 134 can include a monitor, a smart television, an embedded display such as a laptop computer display, or the like.

NV-RAM 140, disk controller 150, and I/O interface 170 are connected to chipset 110 via an I/O channel 112. An example of I/O channel 112 includes one or more point-to-point PCIe links between chipset 110 and each of NV-RAM 140, disk controller 150, and I/O interface 170. Chipset 110 can also include one or more other I/O interfaces, including an Industry Standard Architecture (ISA) interface, a Small Computer Serial Interface (SCSI) interface, an Inter-Integrated Circuit (I$^2$C) interface, a System Packet Interface (SPI), a Universal Serial Bus (USB), another interface, or a combination thereof. NV-RAM 140 includes BIOS/EFI module 142 that stores machine-executable code (BIOS/EFI code) that operates to detect the resources of information handling system 100, to provide drivers for the resources, to initialize the resources, and to provide common access mechanisms for the resources. The functions and features of BIOS/EFI module 142 will be further described below.

Disk controller 150 includes a disk interface 152 that connects the disc controller to a hard disk drive (HDD) 154, to an optical disk drive (ODD) 156, and to disk emulator 160. An example of disk interface 152 includes an Integrated Drive Electronics (IDE) interface, an Advanced Technology Attachment (ATA) such as a parallel ATA (PATA) interface or a serial ATA (SATA) interface, a SCSI interface, a USB interface, a proprietary interface, or a combination thereof. Disk emulator 160 permits SSD 164 to be connected to information handling system 100 via an external interface 162. An example of external interface 162 includes a USB interface, an IEEE 1394 (Firewire) interface, a proprietary interface, or a combination thereof. Alternatively, SSD 164 can be disposed within information handling system 100.

I/O interface 170 includes a peripheral interface 172 that connects the I/O interface to add-on resource 174, to TPM 176, and to network interface 180. Peripheral interface 172 can be the same type of interface as I/O channel 112 or can be a different type of interface. As such, I/O interface 170 extends the capacity of I/O channel 112 when peripheral interface 172 and the I/O channel are of the same type, and the I/O interface translates information from a format suitable to the I/O channel to a format suitable to the peripheral interface 172 when they are of a different type. Add-on resource 174 can include a data storage system, an additional graphics interface, a network interface card (NIC), a sound/video processing card, another add-on resource, or a combination thereof. Add-on resource 174 can be on a main circuit board, on separate circuit board or add-in card disposed within information handling system 100, a device that is external to the information handling system, or a combination thereof.

Network interface 180 represents a network communication device disposed within information handling system 100, on a main circuit board of the information handling system, integrated onto another component such as chipset 110, in another suitable location, or a combination thereof. Network interface 180 includes a network channel 182 that provides an interface to devices that are external to information handling system 100. In a particular embodiment, network channel 182 is of a different type than peripheral interface 172 and network interface 180 translates information from a format suitable to the peripheral channel to a format suitable to external devices. In a particular embodiment, network interface 180 includes a NIC or host bus adapter (HBA), and an example of network channel 182 includes an InfiniBand channel, a Fibre Channel, a Gigabit Ethernet channel, a proprietary channel architecture, or a combination thereof. In another embodiment, network interface 180 includes a wireless communication interface, and network channel 182 includes a Wi-Fi channel, a near-field communication (NFC) channel, a Bluetooth or Bluetooth-Low-Energy (BLE) channel, a cellular based interface such as a Global System for Mobile (GSM) interface, a Code-Division Multiple Access (CDMA) interface, a Universal Mobile Telecommunications System (UMTS) interface, a Long-Term Evolution (LTE) interface, or another cellular based interface, or a combination thereof. Network channel 182 can be connected to an external network resource (not illustrated). The network resource can include another information handling system, a data storage system, another network, a grid management system, another suitable resource, or a combination thereof.

BMC 190 is connected to multiple elements of information handling system 100 via one or more management interface 192 to provide out of band monitoring, maintenance, and control of the elements of the information handling system. As such, BMC 190 represents a processing device different from processor 102 and processor 104, which provides various management functions for information handling system 100. For example, BMC 190 may be responsible for power management, cooling management, and the like. The term BMC is often used in the context of server systems, while in a consumer-level device a BMC may be referred to as an embedded controller (EC). A BMC included at a data storage system can be referred to as a storage enclosure processor. A BMC included at a chassis of a blade server can be referred to as a chassis management controller and embedded controllers included at the blades of the blade server can be referred to as blade management controllers. Capabilities and functions provided by BMC 190 can vary considerably based on the type of information handling system. BMC 190 can operate in accordance with an Intelligent Platform Management Interface (IPMI). Examples of BMC 190 include an Integrated Dell Remote Access Controller (iDRAC).

Management interface 192 represents one or more out-of-band communication interfaces between BMC 190 and the elements of information handling system 100, and can include an Inter-Integrated Circuit (I2C) bus, a System Management Bus (SMBUS), a Power Management Bus (PMBUS), a Low Pin Count (LPC) interface, a serial bus such as a Universal Serial Bus (USB) or a Serial Peripheral Interface (SPI), a network interface such as an Ethernet interface, a high-speed serial data link such as a Peripheral Component Interconnect-Express (PCIe) interface, a Network Controller Sideband Interface (NC-SI), or the like. As used herein, out-of-band access refers to operations performed apart from a BIOS/operating system execution environment on information handling system 100, that is apart from the execution of code by processors 102 and 104 and procedures that are implemented on the information handling system in response to the executed code. BMC 190 operates to monitor and maintain system firmware, such as code stored in BIOS/EFI module 142, option ROMs for graphics adapter 130, disk controller 150, add-on resource 174, network interface 180, or other elements of information handling system 100, as needed or desired. In particular, BMC 190 includes a network interface 194 that can be connected to a remote management system to receive firmware updates, as needed or desired. Here, BMC 190 receives the firmware updates, stores the updates to a data storage device associated with the BMC, transfers the firmware updates to NV-RAM of the device or system that is the subject of the firmware update, thereby replacing the currently operating firmware associated with the device or system, and reboots information handling system, whereupon the device or system utilizes the updated firmware image.

BMC 190 utilizes various protocols and application programming interfaces (APIs) to direct and control the processes for monitoring and maintaining the system firmware. An example of a protocol or API for monitoring and maintaining the system firmware includes a graphical user interface (GUI) associated with BMC 190, an interface defined by the Distributed Management Taskforce (DMTF) (such as a Web Services Management (WS-MAN) interface, a Management Component Transport Protocol (MCTP) or, a Redfish interface), various vendor defined interfaces (such as a Dell EMC Remote Access Controller Administrator (RACADM) utility, a Dell EMC OpenManage Server Administrator (OMSS) utility, a Dell EMC OpenManage Storage Services (OMSS) utility, or a Dell EMC OpenManage Deployment Toolkit (DTK) suite), a BIOS setup utility such as invoked by a "F2" boot option, or another protocol or API, as needed or desired.

In a particular embodiment, BMC 190 is included on a main circuit board (such as a baseboard, a motherboard, or any combination thereof) of information handling system 100, or is integrated into another element of the information handling system such as chipset 110, or another suitable element, as needed or desired. As such, BMC 190 can be part of an integrated circuit or a chipset within information handling system 100. An example of BMC 190 includes an integrated Dell remote access controller (iDRAC), or the like. BMC 190 may operate on a separate power plane from other resources in information handling system 100. Thus BMC 190 can communicate with the management system via network interface 194 while the resources of information handling system 100 are powered off. Here, information can be sent from the management system to BMC 190 and the information can be stored in a RAM or NV-RAM associated with the BMC. Information stored in the RAM may be lost after power-down of the power plane for BMC 190, while information stored in the NV-RAM may be saved through a power-down/power-up cycle of the power plane for the BMC.

Generally, an enterprise utilizes mixed-mode computing management solutions or systems in managing their devices or resources. For example, the enterprise may use a combination of a legacy or traditional on-premise computing management system and a cloud-based computing management system. Because each computing management system has its own set of processes or workflow, resources being managed by one computing management system may have different software and/or firmware updates than the resources being managed by another computing management system. For example, the updates may have different versions from one computing management system to the other. Consequently, there is a need for a reliable, scalable, and secure mechanism to coordinate or synchronize the operations across multiple computing management systems in order deploy a uniform set of updates to the resources managed by one computing management system and to the resources managed by a second computing management system.

Figure 2:
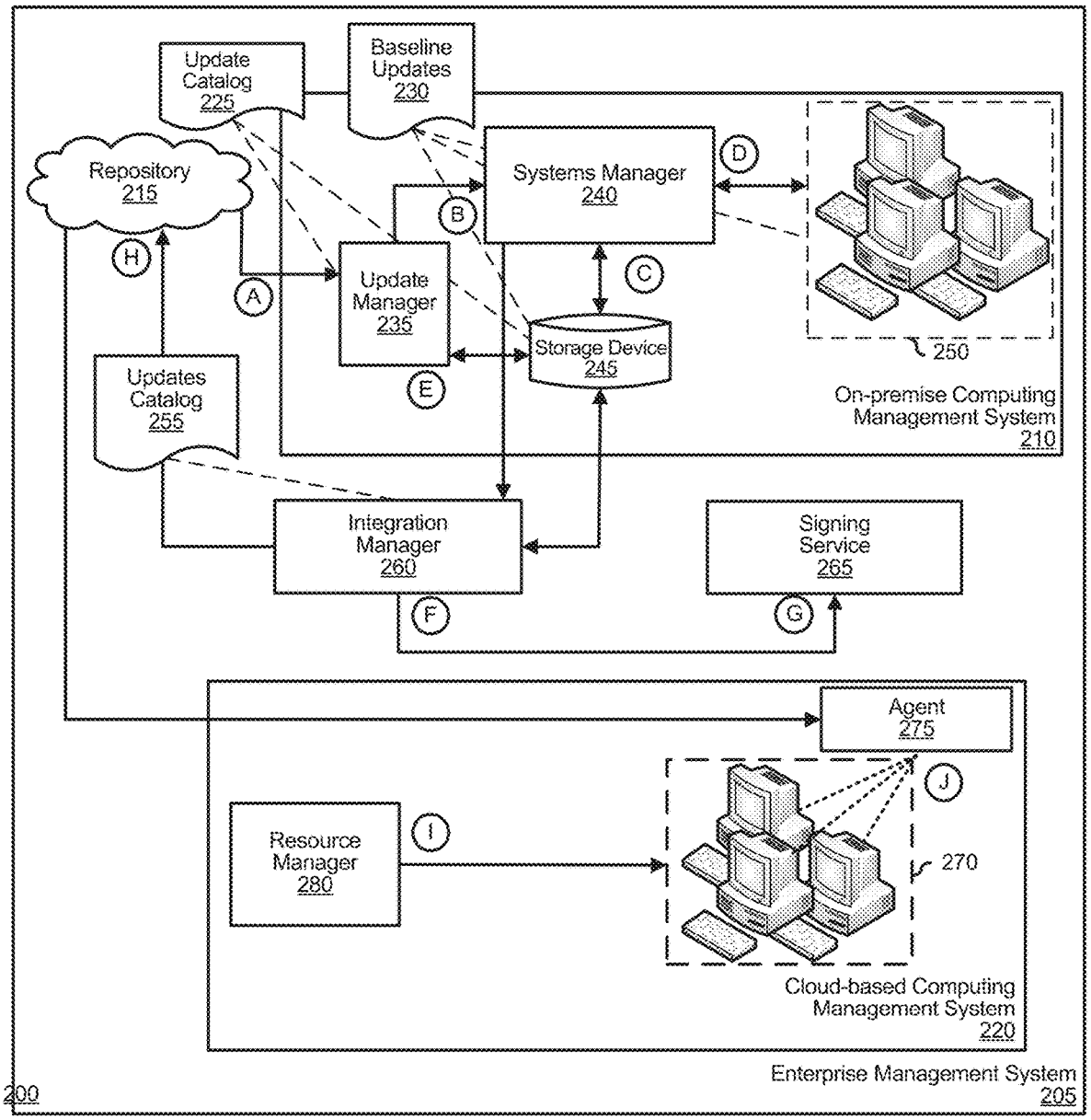
FIG. 2 is a block diagram of a system for bridging gaps between traditional resource management solutions with cloud-based management solutions, according to at least one embodiment of the present disclosure.

FIG. 2 is a block diagram 200 illustrating an enterprise computing management system 205. Enterprise computing management system 205 includes a repository 215, an on-premise computing management system 210, and a cloud-based computing management system 220. On-premise computing management system 210 includes an update manager 235, a systems manager 240, a storage device 245, and managed resources 250. Cloud-based computing management system 220 includes a resource manager 280, an update agent 275, and managed resources 270. Managed resources 250 and managed resources 270 are each a set of information handling systems or devices such as information handling system 100.

Enterprise computing management system 205 provides an automated set of administrative tools to deploy software, protect data, monitor health, and enforce compliance across all clients or devices in an organization. Enterprise computing management system 205 may include two or more interconnected computing management systems which may be manufactured by one or more different vendors, wherein one of the computing management system is an on-premise computing management system and the other is a cloud-based computing management system.

Cloud-based computing management system 220 may be configured to provide administrative support for physical, virtualized, containerized, or other types of abstracted information handling systems. Resource manager 280 is configured to centrally manage, secure, and/or control managed resources 270 including applications therein. Resource manager 280 may be hosted in the cloud. Examples of resource manager 280 include Microsoft Intune® and Workspace ONE®. Managed resources 270 includes mobile devices and cloud-hosted applications. Each managed resource in managed resources 270 may include an update agent 275.

On-premise computing management system 210 is a legacy or traditional management system configured to manage devices and deploy applications or updates. As used herein, updates refer to software, driver, and firmware updates. Systems manager 240 provides a unified management console with the automated set of administrative tools for managing managed resources 250. Systems manager 240 may be an on-premise or traditional computing management systems such as Dell Management Console, Altiris Deployment Server, Microsoft System Center Configuration Manager (SCCM) and BMC Blade Logic.

Update manager 235 may be located locally or remotely and is configured to manage updates including third party updates to managed resources 250. For example, update manager 235 may be configured to download, import, and publish catalogs, applications, and/or updates for managed resources 250. In addition, update manager 235 may modify metadata in a catalog such as update definitions to conform to the format required by systems manager 240. An example of update manager 235 is Microsoft's System Center Updates Publisher (SCUP).

Catalogs such as an update catalog 225 include information such as a download uniform resource locator (URL) or location of the updates, name of the company or organization that created the catalog, date/time the catalog was last imported or modified, etc. Update catalog 225 also includes information that may be used to determine which of the updates are required for the resources being managed by on-premise computing management system 210. Update catalog 225 may be used by on-premise computing management system 210 to provide automated BIOS, firmware, driver and application updates to managed resources 250. Examples of a catalog include Dell® Business Client Updates Catalog and Microsoft® Update Catalog. Format of update catalog 225 may be different from the format of updates catalog 255. Updates catalog 255 may be used by cloud-based computing management system 220 to provide automated BIOS, firmware, driver and application updates to managed resources 270.

Signing service 265 may be configured as an enterprise managed signing service used for code signing. For example, signing service 265 may be configured to digitally sign catalogs and/or update catalog or update files prior to publishing the catalogs and/or the update files. Signing service 265 may be located remotely or locally on-premise of the enterprise.

Integration manager 260 coordinates the operations and bridges the gaps between the updates of the managed resources 250 and managed resources 270. Integration manager 260 may be a software plugin that is incorporated in on-premise computing management system 210. In another embodiment, integration manager 260 may be a stand-alone tool in communication with on-premise computing management system 210. Integration manager 260 may use update catalog 225 and/or baseline updates 230 as a baseline to generate updates catalog 255. Integration manager 260 can understand the format of update catalog 225 and updates catalog 255.

Integration manager 260 may be configured to determine the requirements of cloud-based computing management system 220 and to generate updates catalog 255 based on the said requirements. For example, the catalogs used by cloud-based computing management system 220 may have a different format than catalogs used by on-premise computing management system 210. Thus, integration manager 260 may be configured to extract metadata and/or modify the extracted metadata to conform with the requirements of cloud-based computing management system 220. Thus, integration manager 260 generates updates catalog 255 in a format understood by cloud-based computing management system 220. In addition, because integration manager 260 generates updates catalog 255 based on updates 230, the updates of managed resources 270 would be synchronized with the updates of managed resources 250.

Each of managed resources 250 and 270 may be a server device such as enterprise server, application server, email server, web server, content server, application server, etc. Alternatively, each of managed resources 250 and 270 may be a client device such as a desktop computer, a tablet, a smartphone, etc. In some arrangements, managed resources 250 and 270 may include both server devices and client devices. Managed resources 250 and 270 may also include Internet-of-things (IoT) devices such as household IoT devices, commercial IoT devices, industrial IoT devices, medical IoT devices, etc. Household IoT devices include network-connected home lighting devices, thermostats, smoke detectors, alarm systems and the like. Commercial IoT devices include network-connected cash registers, vending machines, utility meters, and the like. Industrial IoT devices include gas monitors, process equipment controls, and the like. Medical IoT devices include monitors, patient communication devices, and the like. Each of managed resources 250 and 270 may include a network interface with the capability of sending and receiving information.

As used herein, update agent 275 may be configured to detect an application and/or a firmware in a managed resource such as one of managed resources 270. In addition, update agent 275 may be configured with information associated with repository 215 such as its location. Update agent 275 may also be configured determine whether a catalog and/or an update has been published in repository 215 and to determine whether such catalog and/or update is applicable or required by managed resources 270. Update agent 275 may scan repository 215 periodically, such as hourly, daily, weekly, etc. to determine if a catalog has been published. In another embodiment, repository 215 may be configured to notify update agent 275 and/or resource manager 280 if the catalog or the update has been published. In yet another embodiment, integration manager 260 may notify the resource manager 280 and/or update agent 275 that the catalog or the update has been published in repository 215. An example of update agent 275 is a Dell Command Update.

Storage device 245 may be any suitable storage device such as rotating disk drives, flash-based storage, solid-state storage device (such as a flash-based storage device), and the like. Other types of commercially available data storage systems, as well as processors and hardware controlling access to these particular devices, may also be included in an embodiment. Storage device 245 may be configured to store update catalog 225, updates 230, and updates catalog 255 in a database or in a file system for example.

Repository 215 may include a server and a persistent memory where catalogs and updates are persisted such as update catalog 225 and updates catalog 255. In a particular embodiment, the server can be a file server, a database server, or the like. The persistent memory can include one or more disk drives or other suitable persistent memory. When the server is a database server, the updates and/or catalogs within the repository can be organized as a database. When the server is a file server, the file server can locate a file corresponding to the update and send it to update manager 235 and update agent 275. Repository 215 may be located locally on-premise or remotely from enterprise computing management system 205 such as in the cloud and accessible by update agent 275, resource manager 280, integration manager 260, systems manager 240, and update manager 235.

FIG. 2 is annotated with a series of letters A-J. Each of these letters represents a stage of one or more operations. Although these stages are ordered for this example, the stages illustrate one example to aid in understanding this disclosure and should not be used to limit the claims. Subject matter falling within the scope of the claims can vary with respect to the order of the operations.

At stage A, update manager 235 downloads and/or imports update catalog 225. Update catalog 225 may be downloaded automatically or manually by a user such as an administrator. Update manager 235 uses the catalog to automate system updates. Prior to the download of the catalog, update manager 235 may validate and/or verify the catalog. For example, update manager 235 may verify a digital certificate associated with update catalog 225. After the download or import, update manager 235 may store update catalog 225 in storage device 245. In another embodiment, update manager 235 may download and/or import update catalog 225 upon initiation by systems manager 240 or an administrator. In yet another embodiment, systems manager 240 downloads update catalog 225 and directs update manager 235 to import the downloaded catalog.

At stage B, update manager 235 publishes baseline updates 230 to systems manager 240. Update manager 235 may publish baseline updates 230 under direction from systems manager 240. Baseline updates 230 are updates that are applicable to managed resources 250. Prior to publishing, update manager 235 may check for changes in updates in update catalog 225. Update manager 235 may also modify metadata in update catalog 225 such as software update definitions to conform with requirements of systems manager 240 prior to publishing. In another embodiment, update manager 235 may publish baseline updates 230 to an update server (not shown).

At stage C, systems manager 240 stores baseline updates 230 in storage device 245. Baseline updates 230 may be stored in a database or in a file format. In another embodiment, update manager 235 stores baseline updates 230 in storage device 245 under the direction of systems manager 240. At stage D, systems manager 240 deploys baseline updates 230 to managed resources 250. Prior to deploying updates 230, update manager 235 detects whether an application and/or firmware is installed in each one of managed resources 250 and whether update is applicable to the managed resource. For each application and/or firmware, update manager 235 determines whether the application and/or firmware need an update. If the application and/or firmware need an update, then systems manager 240 deploys one or more updates included in baseline updates 230 to the managed resource. Systems manager 240 may use an update policy or a set of update rules to determine whether to update the application and/or firmware in the managed resource.

At stage E, systems manager 240 may notify integration manager 260 that baseline updates 230 has been published and/or deployed to managed resources 250. At stage F, integration manager 260 generates a updates catalog 255 that is based on baseline updates 230 and/or update catalog 225. Integration manager 260 may determine whether baseline updates 230 is applicable to managed resources 270 prior to generating updates catalog 255. If integration manager 260 determines that baseline updates 230 is not applicable to managed resources 270, then integration manager 260 does not generate updates catalog 255.

Integration manager 260 may request signing service 265 to sign updates catalog 255. At stage G, signing service 265 signs updates catalog 255. Signing service 265 may either generate a self-signed certificate or use a certificate from a public key infrastructure. At stage H, integration manager 260 publishes updates catalog 255 to repository 215.

At stage I, update agent 275 is installed on each of the clients being managed by cloud-based computing management system 220. Update agent 275 may be installed prior to stage A. Update agent 275 may be configured to get a notification when updates catalog 255 has been published. In another embodiment, update agent 275 may poll or scan repository 215 periodically to determine if updates catalog 255 has been published.

At stage J, update agent 275 may use updates catalog 255 to determine the available published updates that have been deployed to managed resources 250 and compare with the updates applicable to managed resources 270. Update agent 275 may also determine whether managed resources 270 are to be updated. If managed resources 270 are to be updated, then update agent 275 updates managed resources 270. Update agent 275 may keep track of whether a particular baseline updates catalog has been used to deploy updates to managed resources 270.

In another embodiment, prior to integration manager 260 generating a catalog, systems manager 240 publishes updates from a list of updates determined by integration manager 260 to be applicable to managed resources 270. Systems manager 240 publishes those particular updates to repository 215. Integration manager 260 generates updates catalog 255 based on the particular published updates that are deemed applicable to managed resources 270.

Figure 3:
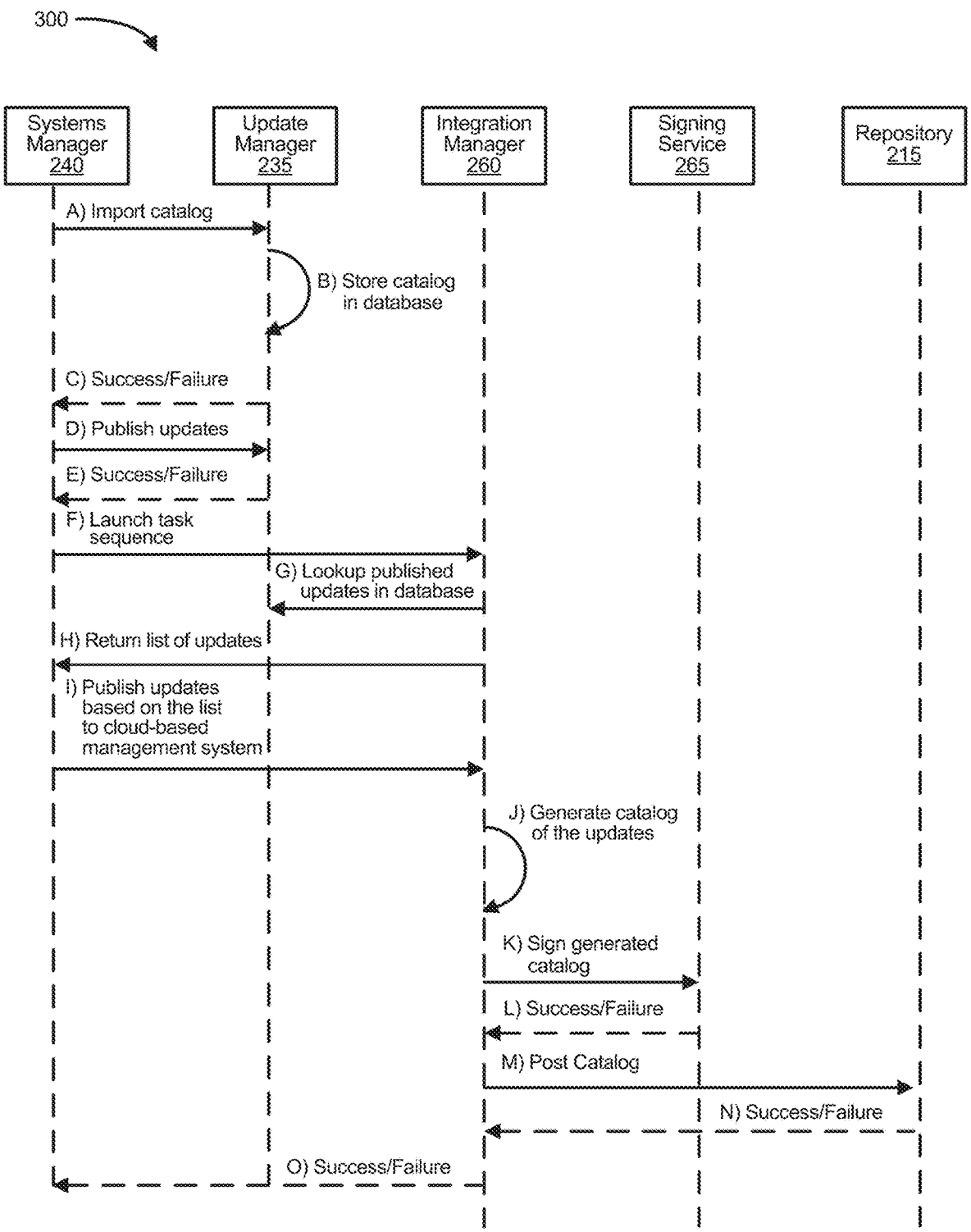
FIG. 3 is a flow diagram of a method for bridging gaps between traditional resource management solutions with cloud-based management solutions, according to at least one embodiment of the present disclosure.

FIG. 3 shows a communication flow 300 for bridging gaps in traditional resource management solutions with cloud-based management solutions. Communication flow 300 includes several requests and responses from various components of enterprise computing management 205 as shown in FIG. 2. Other responses and/or request are not shown in FIG. 3 for simplicity and clarity of the description. The communication may use various protocols such as server message block (SMB) protocol, hypertext transfer protocol (HTTP), or HTTP secure (HTTPS).

SMB protocol is intended to permit data to be transferred efficiently between a server computer and a client computer connected together by a network. In the SMB protocol, a client computer sends a request to a server to perform an operation. The server then sends a reply back to the client when the request has been fulfilled and/or completed.

Communication flow 300 generally starts at request A). At request A) systems manager 240 sends a request to update manager 235 to import a catalog, such as update catalog 225. Prior to the request, the catalog may have been downloaded by an administrator. At request B) after importing the catalog, update manager 235 stores the imported catalog in a database in storage device 245. At response C) after storing the imported catalog in the database, update manager 235 transmits a response to systems manager 240. Response C) may include a success code or a failure code. In addition, response C) may include information regarding the request, such as date/time of the import, date/time of the storage, name of the database, etc.

At request D) systems manager 240 may send a request to update manager 235 to publish the updates in the imported catalog. Update manager 235 publishes the updates which may then be deployed to the managed resources. At response E) update manager 235 may send a response to systems manager 240 similar to response C). Response E) may trigger request F).

At request F) systems manager 240 may send a request to integration manager 260 such as to launch an extension such as a plugin based extension. The request may be initiated automatically in response to response E). Request F) may also be initiated manually by an administrator. In response to receiving the request to launch the extension, integration manager 260 may launch a plugin that is registered with systems manager 240 that may be used to bridge the gap in updates between managed resources managed by on-premise computing management system and cloud-based computing management system. For management solutions that do not support plugin based extension, tasks or some other form of extensions may apply. The series of tasks may be included in a workflow.

At request G) integration manager 260 determines the updates deployed to the managed resources of the on-premise computing management system. Integration manager 260 may determine the updates by performing a query from the database in storage device 245. At response H) integration manager 260 returns a list of the updates to systems manager 240. Integration manager 260 may return the list of updates for verification and/or approval. At request I) systems manager 240 may send a request to integration manager 260 to publish the updates to the cloud-based management system. Request I) may be sent after verification and/or approval of an administrator. The verification and/or approval may be performed automatically or manually.

At request J) integration manager 260 generates a catalog of the updates. The integration manager 260 may generate the catalog based on metadata of the updates. Integration manager 260 may generate the catalog in a format understood by the cloud-based computing management system. At request K) integration manager 260 sends a request to signing service 265 to sign the generated catalog. Integration manager 260 may send the generated catalog with request K) or include a link to the generated catalog. At response L) after performing the request, signing service 265 may transmit a response with a success code or a failure code to integration manager 260. The response may also include other information such as the date and/or time when the generated catalog was signed. The response may also include a public key.

At request M) if response L) includes a success code, then integration manager 260 transmits a request to post the signed catalog to repository 215. Request M) may include the signed catalog or a location of the signed catalog to be posted. At response N) after performing the request, repository 215 may transmit a response with a success or a failure code to integration manager 260. Response N) may also include other information such as the location of the signed catalog in repository 215 and date/time of the post.

At response O) in response to receiving response N), integration manager 260 may transmit a response with a success code or a failure code to systems manager 240. Response O) may include a success code if both responses L) and N) include a success code. Response O) may include a failure code if either one of responses L) or N) includes a failure code. If response N) includes a success code then an update agent hosted by a managed device or a managed resource of the cloud-based computing management system may be notified. The update agent may then use the catalog to update the managed resource.

Figure 4:
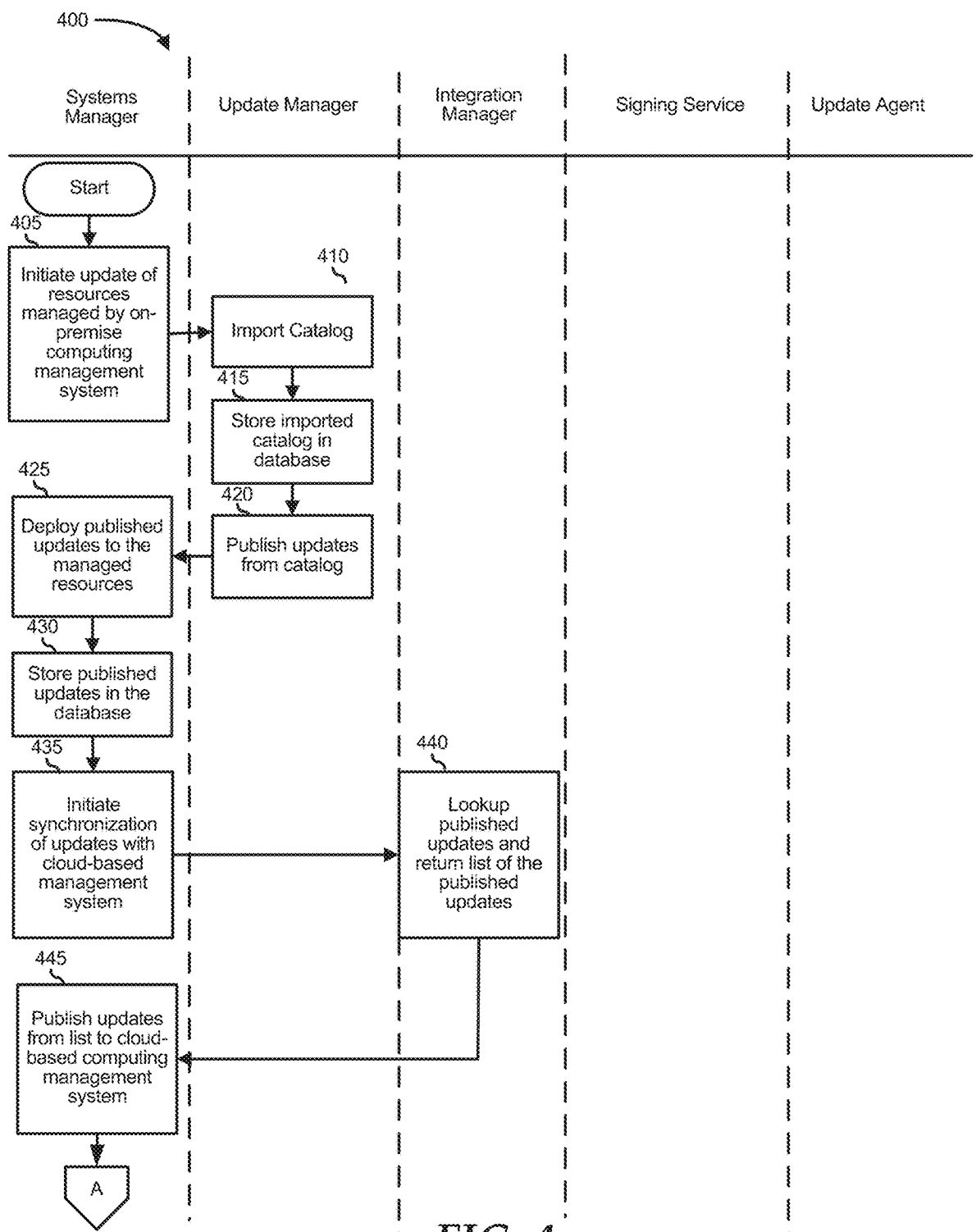
FIG. 4 and FIG. 5 are flowcharts illustrating a method for bridging gaps between traditional resource management solutions with cloud-based management solutions, according to at least one embodiment of the present disclosure.

FIG. 4 is a flowchart illustrating a method 400 for bridging the gap between updates of managed resources in a traditional computing management system with updates of managed resources in a cloud-based computing management system. The method 400 may be performed by one or more components depicted in FIG. 2. The method 400 typically starts at block 405.

At block 405, the systems manager initiates a workflow to update resources managed by a traditional or an on-premise computing management system. The method proceeds to block 410. At block 410, in response to the initiation of the workflow, the update manager imports a catalog from a repository. Prior to importing the catalog, the update manager may determine whether the catalog is applicable to the resources being managed by the on-premise computing management system. The update manager may also determine whether the catalog has not been imported before and/or whether the catalog is the latest catalog in the repository. The method then proceeds to block 415.

At block 415, the update manager stores the imported catalog in a database. The database may be owned and managed by the update manager. The database may be common to the other components in the on-premise computing management system such as the systems manager and the integration manager. The method proceeds to block 420.

At block 420, the update manager publishes the updates included in the catalog. The update manager may publish the updates to the systems manager or an update server. The update server may be configured to host published updates for deployment to the managed resources. The method proceeds to block 425.

At block 425, the systems manager deploys the published updates to the resources managed by the on-premise computing management system. The method proceeds to block 430. At block 430, the systems manager stores the published updates in the database. The database may be the same or different from the database that stores the imported catalog. The method proceeds to block 435.

At block 435, the systems manager initiates synchronization of updates deployed to the managed resources of the on-premise computing management system with updates to be deployed to the managed resources of the cloud-based computing management system. The initiation of the synchronization may be triggered by block 425 or by block 430. The systems manager may send a request to the integration manager to initiate the synchronization to bridge the gap or delta between the updates of the managed resources between at least two disparate computing management systems. For example, the synchronization determines the delta between the current updates to the managed resources of the on-premise computing management system and the existing updates to the managed resources of the cloud-based computing management system. The synchronization further uses the current updates as the baseline in the synchronization. If there is no delta, then the synchronization process is halted or the current updates are disregarded. The synchronization includes generating and publishing a catalog based on the deployed updates to the managed resources of the on-premise computing management system. The method proceeds to block 440.

At block 440, the integration manager performs a lookup of the published updates and returns a list of the published updates to the systems manager. The integration manager may perform the lookup by querying the database or parsing the imported catalog. The integration manager may determine whether the updates or a subset thereof are applicable to the managed resources of the cloud-based computing management system. Applicable updates are included in the list. If a particular update is not applicable to the managed resources of the cloud-based computing management system, then the integration manager may not include the particular update to the list. The integration manager may determine whether the particular update is applicable by retrieving metadata associated with the published updates from the database. In another embodiment, the integration manager parses the imported catalog files to determine the aforementioned metadata. The method proceeds to block 445.

Figure 5:
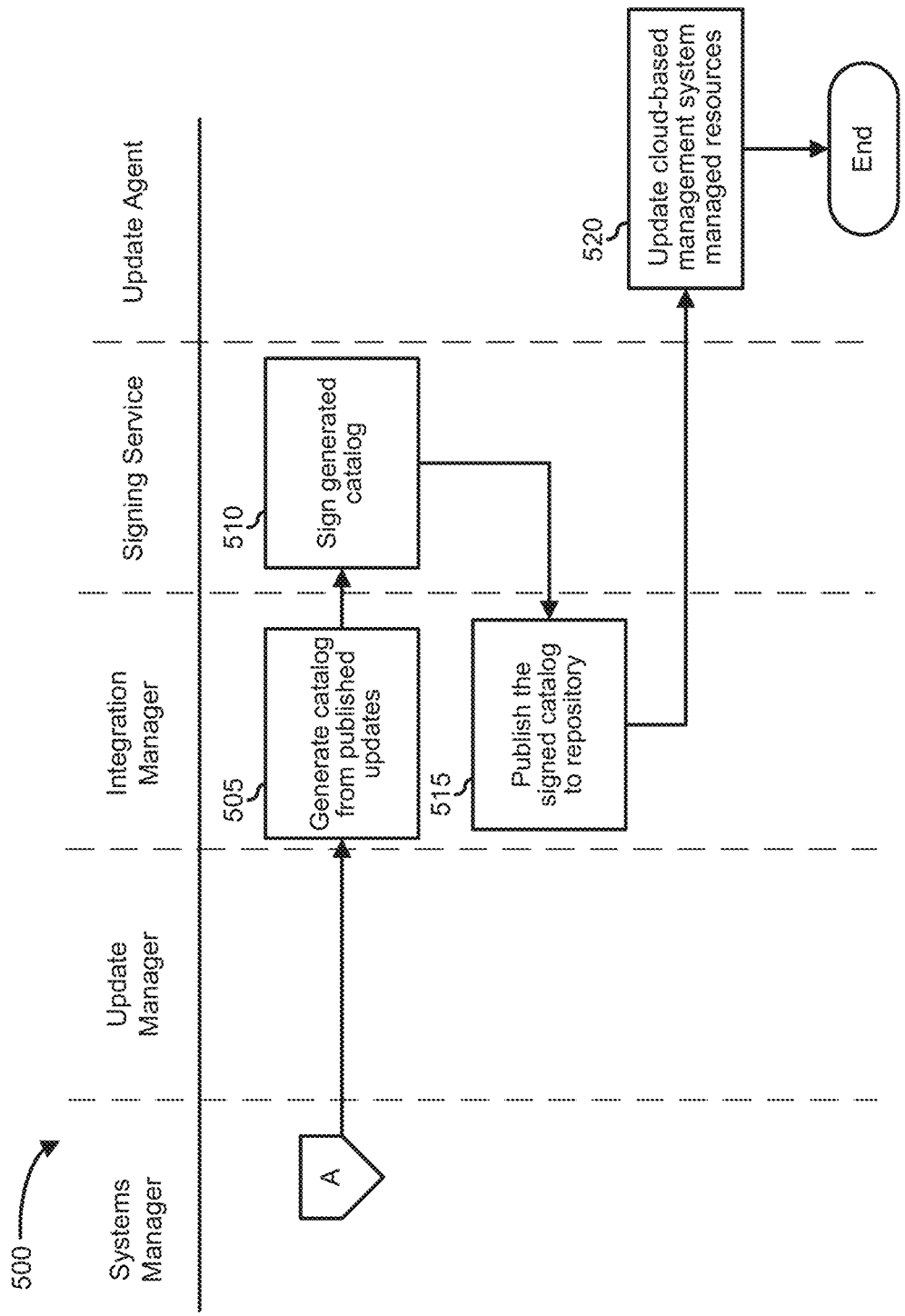

At block 445, the systems manager publishes the updates from the returned list. The updates may be published to a repository that is accessible by an update agent and/or resource manager of the cloud-based computing management system. The method proceeds to block 505 of FIG. 5.

FIG. 4 is a flowchart illustrating a method 500 that is a continuation of method 400. The method 500 begins at block 505. At block 505, the integration manager generates a catalog based on the updates published by the systems manager to the cloud-based computing management system. Thus, the integration manager may generate the catalog based on the applicable published updates, wherein the applicable published updates may be a subset of the updates deployed to the managed resources of the on-premise computing management system.

In addition to understanding the format of the catalog for the cloud-based computing management system, the integration manager understands the format or object structure of the published updates of the on-premise computing management system such as the SCCM packages. The integration manager may store the generated catalog in a storage device. The generated catalog is in a format that is understood by the cloud-based computing management system.

The integration manager may transmit a request to the signing service to sign the generated catalog. The integration manager may include the generated catalog with the request. In another embodiment, the integration manager may send information regarding the location of the catalog. In yet another embodiment, the integration manager may send a hash of the generated catalog to the signing service for signature. The hash may be computed using a variety of hashing algorithms. The hash value may be stored in the database and associated with the generated catalog. The method proceeds to block 510.

At block 510, the signing service signs the catalog generated by the integration manager. The signing service may use a private key to generate a digital signature that may be used to sign the catalog. Prior to signing the catalog, the signing service may verify the identity of the entity that requested the signature. After signing the catalog, the signing service may transmit a response to the integration manager. The response may include information whether the signing server was successful or not in signing the catalog generated by the integration manager. The method proceeds to block 515.

At block 515, the integration manager publishes the catalog signed by the signing service to a repository. The repository may be located in the cloud or locally on-premise. After publishing the signed catalog, the method proceeds to block 520. At block 520, an update agent deploys the updates included in the catalog that was published in the repository. The update agent is installed in each of the resources managed by the cloud-based computing management system. The update agent may have installed during the manufacture of the managed resource. The update agent may have also been deployed by an administrator as part of the setup. In another embodiment, the update agent may have been installed by the resource manager. After deploying the published updates to the resources managed by the cloud-based management system, the method ends.

The flowcharts are provided to aid in understanding the illustrations and are not to be used to limit the scope of the claims. The flowcharts depict example operations that can vary within the scope of the claims. Additional operations may be performed; fewer operations may be performed; the operations may be performed in parallel; and the operations may be performed in a different order. For example, the operations depicted in blocks 420 and 425 can be performed in parallel or concurrently. In another example, block 425 may be performed before block 420.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionalities as described herein. Also, the term "user" in this context and elsewhere herein is intended to be more broadly construed so as to encompass, for example, human, hardware, software or firmware entities, as well as various combinations of such entities.

The present disclosure contemplates a computer-readable medium that includes instructions or receives and executes instructions responsive to a propagated signal; so that a device connected to a network can communicate voice, video or data over the network. Further, the instructions may be transmitted or received over the network via the network interface device.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories.

Further, the computer-readable medium can be a random-access memory or other volatile re-writable memory. Additionally, the computer-readable medium can include a magneto-optical or optical medium, such as a disk or tapes or another storage device to store information received via carrier wave signals such as a signal communicated over a transmission medium. A digital file attachment to an e-mail or other self-contained information archive or set of archives may be considered a distribution medium that is equivalent to a tangible storage medium. Accordingly, the disclosure is considered to include any one or more of a computer-readable medium or a distribution medium and other equivalents and successor media, in which data or instructions may be stored.

For purposes of this disclosure information handling system 100 can include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, information handling system 100 can be a personal computer, a laptop computer, a smart phone, a tablet device or other consumer electronic device, a network server, a network storage device, a switch, a router, or another network communication device, or any other suitable device and may vary in size, shape, performance, functionality, and price. Further, information handling system 100 can include processing resources for executing machine-executable code, such as CPU 102, a programmable logic array (PLA), an embedded device such as a System-on-a-Chip (SoC), or other control logic hardware. Information handling system 100 can also include one or more computer-readable medium for storing machine-executable code, such as software or data.

Although only a few exemplary embodiments have been described in detail above, those skilled in the art will readily appreciate that many modifications are possible in the exemplary embodiments without materially departing from the novel teachings and advantages of the embodiments of the present disclosure. Accordingly, all such modifications are intended to be included within the scope of the embodiments of the present disclosure as defined in the following claims. In the claims, means-plus-function clauses are intended to cover the structures described herein as performing the recited function and not only structural equivalents but also equivalent structures.

What is claimed is:

1. A method to synchronize updates between a traditional computing management system and a cloud-based computing management system, the method comprising:
deploying a first update and a second update of the updates to a first resource that is managed by the traditional computing management system; and
in response to the deploying the updates to the first resource:
retrieving, by a processor, metadata of the updates, wherein the metadata conforms to a first format of the traditional computing management system;
determining whether the first update and the second update are applicable to a second resource that is managed by the cloud-based computing management system;
in response to determining that the first update is applicable to the second resource and that the second update is not applicable to the second resource:
generating a catalog based on the metadata of the first update, wherein the catalog is further based on a delta between the first update and a current update of the second resource;
updating the metadata to conform to a second format of the cloud-based computing management system;
publishing the catalog to a repository accessible by the cloud-based computing management system;
notifying the cloud-based computing management system regarding the publishing the catalog to the repository; and
deploying the first update to the second resource.

2. The method of claim 1, further comprising:
determining based on the metadata whether a subset of a third update is applicable to the second resource; and
in response to the determining that the subset of the third update is applicable to the second resource:
generating a particular catalog, wherein the particular catalog is based on the subset of the third update; and
publishing the particular catalog to the repository accessible by the cloud-based computing management system.

3. The method of claim 1, wherein an update agent is installed on the second resource.

4. The method of claim 3, wherein the catalog is in the second format understood by the update agent.

5. The method of claim 3, wherein the update agent is configured with information regarding a location of the repository.

6. The method of claim 1, wherein the catalog is signed by a signing service prior to the publishing the catalog to the repository.

7. An enterprise computing management system comprising:
an on-premise computing management system for deploying a first update and a second update to a first resource and for triggering synchronization of the first update and the second update to a second resource after deploying the first update and the second update, wherein the first resource is managed by the on-premise computing management system;
a cloud-based computing management system for deploying the first update and the second update to the second resource, wherein the second resource is managed by the cloud-based computing management system; and
a processor that in response to the triggering of the synchronization of the first update and the second update to the second resource is operable to:
retrieve metadata information of the first update and the second update, wherein the metadata information conforms to a first format of the on-premise computing management system;
determine whether the first update and the second update are applicable to the second resource;
in response to a determination that the first update is applicable to the second resource and that the second update is not applicable to the second resource:
generate a catalog based on the metadata information of the first update, wherein the catalog is further based on a delta between the first update and a current update of the second resource;
update the first metadata to conform to a second format of the cloud-based computing management system;
publish the catalog to a repository accessible by the cloud-based computing management system;
notify the cloud-based computing management system regarding the publish of the catalog to the repository; and
deploy the first update to the second resource.

8. The enterprise computing management system of claim 7, wherein the processor is further operable to transmit the catalog to a signing service prior to the publish of the catalog to the repository.

9. The enterprise computing management system of claim 7, wherein an update agent is installed in the second resource, and wherein the update agent has access to the repository.

10. The enterprise computing management system of claim 9, wherein the catalog is in the second format understood by the update agent.

11. The enterprise computing management system of claim 7, wherein the catalog is based on a gap of particular updates between the first resource and the second resource.

12. The enterprise computing management system of claim 7, wherein the processor is further operable to determine whether a subset of a third update is applicable to the second resource.

13. The enterprise computing management system of claim 7, wherein the first update is used as a baseline of the synchronization.

14. A non-transitory computer-readable medium including code that when executed causes a processor to perform a method, the method comprising:
retrieving metadata information of a first update and a second update to a first resource that is managed by a traditional computing management system, wherein the metadata information conforms to a first format of the traditional computing management system;
determining whether the first update and the second update are are applicable to a second resource that is managed by a cloud-based computing management system; and
in response to the determining that the first update is applicable to the second resource and the second update is not applicable to the second resource:
generating a catalog that is based on the metadata information of the first update to the first resource;

updating the metadata information to conform to a second format of the cloud-based computing management system publishing the catalog to a repository accessible by the cloud-based computing management system;

notifying the cloud-based computing management system regarding the publishing the catalog to the repository; and deploying the first update to the second resource.

15. The non-transitory computer-readable medium of claim 14, wherein the method further comprising transmitting the catalog to a signing service prior to the publishing of the catalog to the repository.

16. The non-transitory computer-readable medium of claim 14, wherein an update agent is installed in the second resource, and wherein the update agent has access to the repository.

17. The non-transitory computer-readable medium of claim 16, wherein the catalog is in a format understood by the update agent.

18. The non-transitory computer-readable medium of claim 14, wherein the catalog is based on a gap of updates between the first resource and the second resource.

19. The non-transitory computer-readable medium of claim 14, wherein the processor is further configured to determine whether a subset of a third update is applicable to the second resource.

20. The non-transitory computer-readable medium of claim 14, in response to the determining that the second update is not applicable to the second resource, disregarding the second update.

* * * * *